United States Patent [19]

Jung et al.

[11] 4,184,369

[45] Jan. 22, 1980

[54] DEVICE FOR THE CONTINUOUS MEASUREMENT OF THE LIQUID LEVEL IN A CONTAINER

[75] Inventors: Wilhelm Jung, Giessen-Kleinlinden; Wolfgang Stark, Kriftel, both of Fed. Rep. of Germany

[73] Assignee: VDO Adolf Schindling AG, Frankfurt am Main, Fed. Rep. of Germany

[21] Appl. No.: 967,642

[22] Filed: Dec. 8, 1978

[30] Foreign Application Priority Data

Jan. 30, 1978 [DE] Fed. Rep. of Germany ....... 2803863

[51] Int. Cl.² .............................................. G01F 23/26
[52] U.S. Cl. .................................... 73/304 C; 361/284
[58] Field of Search ....................... 73/304 C; 361/284

[56] References Cited

U.S. PATENT DOCUMENTS

| | | | |
|---|---|---|---|
| 2,544,012 | 3/1951 | Edelman | 361/284 |
| 3,037,165 | 5/1962 | Kerr | 361/284 |
| 3,433,072 | 3/1969 | Virtanen et al. | 361/284 |
| 4,142,415 | 3/1979 | Jung et al. | 73/304 C |

*Primary Examiner*—Donald O. Woodiel

[57] ABSTRACT

A capacitive sensing element for use in a liquid level measuring apparatus, wherein the capacitive sensing element is the oscillation determining element of an oscillator, the sensing element including a plurality of elongate electrodes embedded in an insulating material, and wherein calibration of the sensing element for different containers is obtained by piercing the element and electrodes to provide electrodes of different lengths.

3 Claims, 3 Drawing Figures

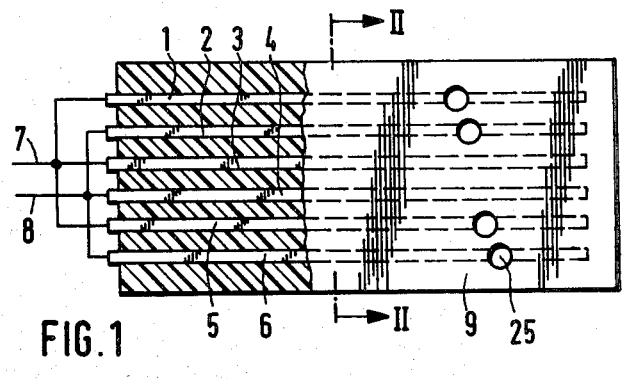
FIG.1    FIG.2
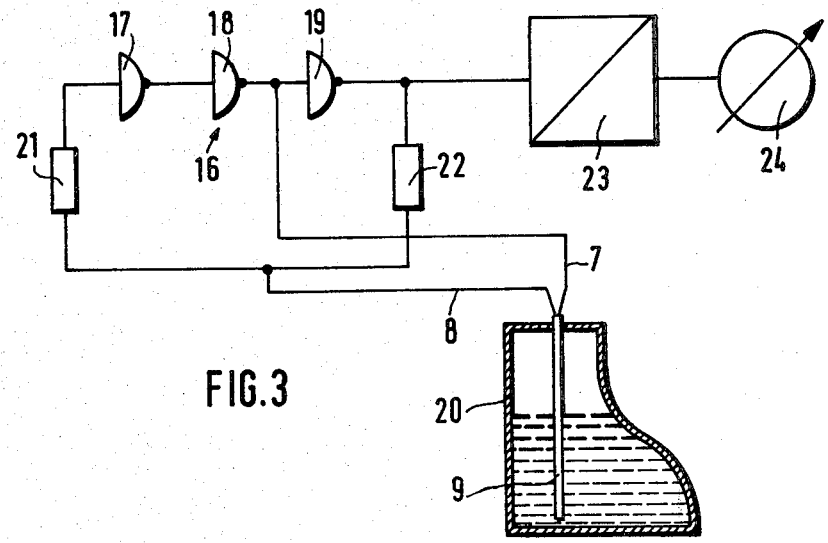
FIG.3

DEVICE FOR THE CONTINUOUS MEASUREMENT OF THE LIQUID LEVEL IN A CONTAINER

BACKGROUND OF THE INVENTION

The invention relates to a device for the continuous measurement of the liquid level in a container, particularly a fuel container of a motor vehicle, with a capacitive sensing element comprising a number of oblong electrodes embedded in an insulating material, which sensing element is the oscillation-determining element of an oscillator including one or more electric circuits in a structure that permits the generation of highly resistant input impedances, as dislosed, for example in copending application Ser. No. 841,111, filed Oct. 11, 1977 to Jung et al, now U.S. Pat. No. 4,142,415 issued Mar. 6, 1979 and German application P 27 47 326.

A device of this kind is, as stated in the copending aplications noted above, particularly suitable for measuring the level of liquid with a small relative dielectric constant, such as gasoline, since the device of the invention has sufficient sensitivity to measure and utilize the capacity change between a full and empty container or tank.

A special advantage of the sensing element of the invention is that almost any desired calibration characteristic can be produced so that the device can be used even in containers of complicated shape, and an accurate indication of the residual quantity can be obtained. The setting of the desired calibration characteristic is particularly simple when a flexible, band-shaped sensing element is employed, and adjustment or manufacture of the sensing element in the desired form are required. Another possible construction is a sensing element with rigid electrodes whose width varies along their longitudinal axes. In the latter sensing device, additional means for calibration of the sensing element are unnecessary, but the production of the calibration characteristic is more expensive than in the case of the sensing element first mentioned above.

A further type of prior art device is disclosed in British patent No. 819,712 of 1959.

SUMMARY OF THE INVENTION

These disadvantages are overcome by the invention, which has for an object to improve the device with regard to adjustability and fixation of the calibration characteristic.

The object of the invention is achieved by means of a device wherein for the setting of specific calibration characteristics, electrodes of different lengths are provided, rather than differences in the cross-sectional widths of the electrodes, as in some prior art devices.

The result is thus achieved with the invention that the desired calibration characteristic can be quickly and economically empirically determined, and only the individual electrodes in the insulating material are changed or displaced. Moreover, the sensing element itself can be manufactured in a much simpler way, since commercial strand material can be used for the electrodes. Both factors affect the production cost advantageously. Additional measures for fixing the shape of the sensing element are only necessary when a flexible sensing device is used, which is generally limited to exceptional cases.

According to one embodiment, in a device with a sensing element of the type of a multiwire band line, the electrodes of different lengths are manufacturd by perforation of the band line. Such an embodiment presents particular manufacturing advantages, since the perforation of the band line and the cutting to length thereof can be carried out over the desired length.

BRIEF DESCRIPTION OF THE DRAWINGS

FIG. 1 is a plan view of a sensing element of the type comprising a ribbon-shaped cable;

FIG. 2 is a cross section through the sensing element of FIG. 1, taken along the line II—II in FIG. 1; and FIG. 3 is a schematic diagram of the device.

DETAILED DESCRIPTION OF THE PREFERRED EMBODIMENT

The sensing element shown in FIGS. 1 and 2 comprises six strand-shaped electrodes 1, 2, 3, 4, 5 and 6 of rectangular cross section, of which the electrodes 1, 3 and 5 are electrically connected with each other and to a connecting line 7, and the electrodes 2, 4 and 6 are electrically connected to each other and to a connecting line 8. The electrodes are positioned in an insulating material element 9, which insulates them from each other as well as from the liquid to be measured. The layers of insulating element 9, insulating the electrodes from the liquid, are of approximately equal thickness on both sides of the electrodes and are so thin that the electric field generated between the electrodes can be influenced from both sides of insulating element 9.

For the setting of a specific calibration characteristic, the individual electrodes are of different effective shape with respect to their effective length. The setting of the electrode length desired in each case takes place by punching holes 25 into the sensing element, thereby severing the electrodes and making them of the desired length.

As shown in FIG. 3, the device consists of an oscillator 16, comprising three series-connected inverters 17, 18 and 19. The output of the second inverter 18 is connected via the sensing element 9 and a first resistor 21 to the input of inverter 17, and via a second resistor 22 to the output of inverter 19. An indicating instrument 24 is connected to the output of inverter 19 via a monostable multivibrator 23. This circuit presents a high input impedance, thereby obtaining voltage stabilization and eliminating the need for an operating voltage stabilizer.

We claim:

1. In a device for the continuous measurement of the liquid level in a container, comprising capacitive sensive element of the multiwire band line type as the oscillation-determining element of an oscillator in an electric circuit having a high input impedance, said sensing element having a plurality of elongate electrodes severed by piercing the band line to obtain electrodes of different lengths, said electrodes embedded in an insulating material, said electrodes being of different lengths to obtain desired calibration characteristics.

2. A device as claimed in claim 1, wherein the sensing element is an essentially flat, rectangular strip with the electrodes being parallel to one another and comprising commercial strand material.

3. A device as claimed in claim 1, further comprising an electrode connecting line, said electrodes having rectangular cross sections and being insulated from each other and from the liquid to be measured by insulating layers and being electrically connected with each other and to said connecting line on both sides of the electrodes, said layers having minimum equal thickness permitting influencing the electric field generated by the electrodes from both sides of the insulating layers.

* * * * *